US010007846B2

(12) United States Patent
Inaba

(10) Patent No.: US 10,007,846 B2
(45) Date of Patent: Jun. 26, 2018

(54) IMAGE PROCESSING METHOD

(71) Applicant: CANON IMAGING SYSTEMS INC., Niigata-shi (JP)

(72) Inventor: Yasushi Inaba, Niigata (JP)

(73) Assignee: CANON IMAGING SYSTEMS INC., Niigata-Shi (JP)

( * ) Notice: Subject to any disclaimer, the term of this patent is extended or adjusted under 35 U.S.C. 154(b) by 0 days. days.

(21) Appl. No.: 15/287,066

(22) Filed: Oct. 6, 2016

(65) Prior Publication Data

US 2017/0024626 A1 Jan. 26, 2017

Related U.S. Application Data

(63) Continuation of application No. PCT/JP2015/084585, filed on Dec. 3, 2015.

(30) Foreign Application Priority Data

Dec. 22, 2014 (JP) .................................. 2014-259258
Sep. 30, 2015 (JP) .................................. 2015-193735

(51) Int. Cl.
*G06K 9/00* (2006.01)
*G06T 5/00* (2006.01)
(Continued)

(52) U.S. Cl.
CPC ....... *G06K 9/00724* (2013.01); *G06K 9/3216* (2013.01); *G06K 9/3258* (2013.01); *G06K 9/3283* (2013.01); *G06K 2209/01* (2013.01)

(58) Field of Classification Search
CPC ............. G06K 9/00724; G06K 9/3216; G06K 9/3258; G06K 9/3283
See application file for complete search history.

(56) References Cited

U.S. PATENT DOCUMENTS 5,243,668 A 9/1993 Kitamura et al.
8,755,603 B2 6/2014 Nagamine et al.
(Continued)

FOREIGN PATENT DOCUMENTS

JP H03250280 A 11/1991
JP 2007081681 A 3/2007
(Continued)

OTHER PUBLICATIONS

Ben-Ami et al. "Racing Bib Number Recognition", School of Electrical Engineering, pp. 1-10. 2011. <http://www.eng.tau.ac.il/~avidan/papers/RBNR.pdf>.
(Continued)

*Primary Examiner* — David F Dunphy
(74) *Attorney, Agent, or Firm* — Rossi, Kimms & McDowell LLP

(57) ABSTRACT

An image processing method for a picture of a participant, photographed in an event, such as a marathon race, increases the accuracy of recognition of a race bib number by performing image processing on a detected race bib area, and associates the recognized race bib number with a person included in the picture. This image processing method detects a person from an input image, estimates an area in which a race bib exists based on a face position of the detected person, detects an area including a race bib number from the estimated area, performs image processing on the detected area to thereby perform character recognition of the race bib number from an image subjected to image processing, and associates the result of character recognition with the input image.

14 Claims, 10 Drawing Sheets

(51) Int. Cl.
    *G06T 7/60*     (2017.01)
    *G06K 9/52*     (2006.01)
    *G06T 7/00*     (2017.01)
    *G06K 9/32*     (2006.01)

(56) References Cited

U.S. PATENT DOCUMENTS

| | | | |
|---|---|---|---|
| 8,934,674 B2 | 1/2015 | Tanabiki et al. | |
| 2010/0158315 A1* | 6/2010 | Martin | G06F 17/30247<br>382/103 |
| 2012/0134588 A1* | 5/2012 | Zhang | G06K 9/3275<br>382/176 |
| 2012/0330646 A1* | 12/2012 | Andrade | G06F 17/289<br>704/7 |
| 2013/0108160 A1* | 5/2013 | Yamazoe | G06K 9/723<br>382/177 |
| 2015/0039583 A1* | 2/2015 | Liu | G06F 17/30864<br>707/706 |
| 2017/0308757 A1* | 10/2017 | Nguyen | H04W 4/02 |

FOREIGN PATENT DOCUMENTS

| | | |
|---|---|---|
| JP | 2011078009 A | 4/2011 |
| JP | 2011186576 A | 9/2011 |
| JP | 2013069015 A | 4/2013 |
| WO | 2012077267 A1 | 6/2012 |

OTHER PUBLICATIONS

International Search Report issued in PCT/JP2015/084585, dated Feb. 2, 2016. Form PCT/ISA/210. English translation provided.
Written Opinion issued in PCT/JP2015/084585, dated Feb. 2, 2016. Form PCT/ISA/237.

* cited by examiner

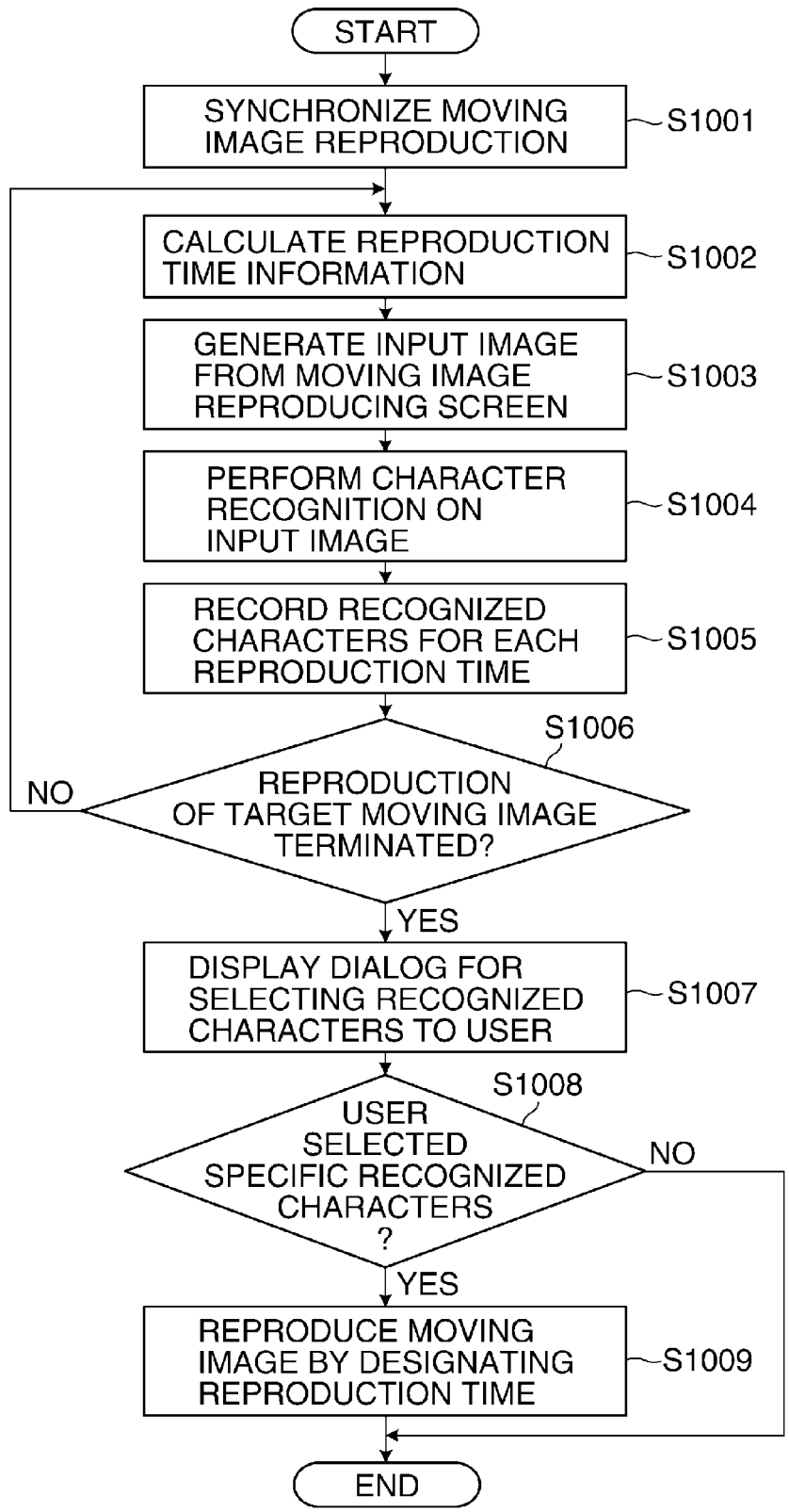

IMAGE PROCESSING METHOD

BACKGROUND OF THE INVENTION

Field of the Invention

The present invention relates to an image processing method for a picture photographed in an event, such as a marathon race.

Description of the Related Art

Conventionally, there has been known a technique for estimating a position of a race bib based on a detected position of a runner's face, and reading a race bib number using an OCR (Optical Character Reader) (see "Racing Bib Number Recognition" written by Idan Ben-Ami, Tali Basha, and Shai Avidan, http://www.eng.tau.ac.il/~avidan/papers/RBNR.pdf).

However, the technique described in Non-PTL 1 has a problem that when a race bib number of a person is read from a photographed image, characters on e.g. a billboard or a road sign in the background within the image are erroneously detected as the race bib number. Further, in a case where a face of a person cannot be detected from an image, and in a case where a race bib is largely deformed, causing deformation of the shape of the race bib number, it is impossible to correctly read the race bib number by character recognition performed using the OCR. Further, a race bib attached to the body of a runner has a characteristic that in a case where the image is photographed from a lateral direction, the race bib is more largely deformed toward an end in a view depth direction, and a character interval is changed. The technique described in Non-PTL 1 assumes a case where a runner is photographed from the front, and hence it is impossible to correctly read the race bib number using the OCR in the above-described case.

Further, there is a problem that if a person overlaps the runner or if a hand of the runner is positioned in front of the race bib, part of the race bib is hidden, and this prevents the race bib number from being correctly recognized. If only part of the race bib number is detected in such a case, it is also difficult to determine whether or not the race bib number is correctly detected.

SUMMARY OF THE INVENTION

The present invention has been made in view of these problems, and provides an image processing method for performing image processing on a race bib area detected in an image of a participant of an event, which has been photographed in the event, to thereby enhance the recognition accuracy of a race bib number and associate the recognized race bib number and the person within the image with each other.

To solve the above-described problems, an image processing method as recited in claim 1 is characterized by comprising an object detection step of detecting one or a plurality of specific objects from an input image, a first area estimation step of estimating a first area in which identification information for identifying the object exists, from a position of the object detected in the object detection step, a second area detection step of detecting a second area including the identification information, within the first area estimated in the first area estimation step, an image processing step of performing image processing with respect to the second area detected in the second area detection step, and an identification information recognition step of performing recognition processing of the identification information with respect to a processing result in the image processing step, and associating a result of the recognition processing with the input image.

According to the present invention, a race bib area is efficiently detected in a photographed image, and image processing is performed with respect to the race bib area, whereby it is possible to enhance the recognition accuracy of a race bib number, and associate the recognized race bib number and the person image with each other.

Further features of the present invention will become apparent from the following description of an exemplary embodiment with reference to the attached drawings.

BRIEF DESCRIPTION OF THE DRAWINGS

FIG. 10 is a flowchart useful in explaining a process performed by the image processing apparatus 900 from synchronization of moving image reproduction to reproduction of a moving image of a runner having a race bib number selected by a user.

DESCRIPTION OF THE EMBODIMENTS

The present invention will now be described in detail below with reference to the drawings showing an embodiment thereof.

First Embodiment

Figure 1:
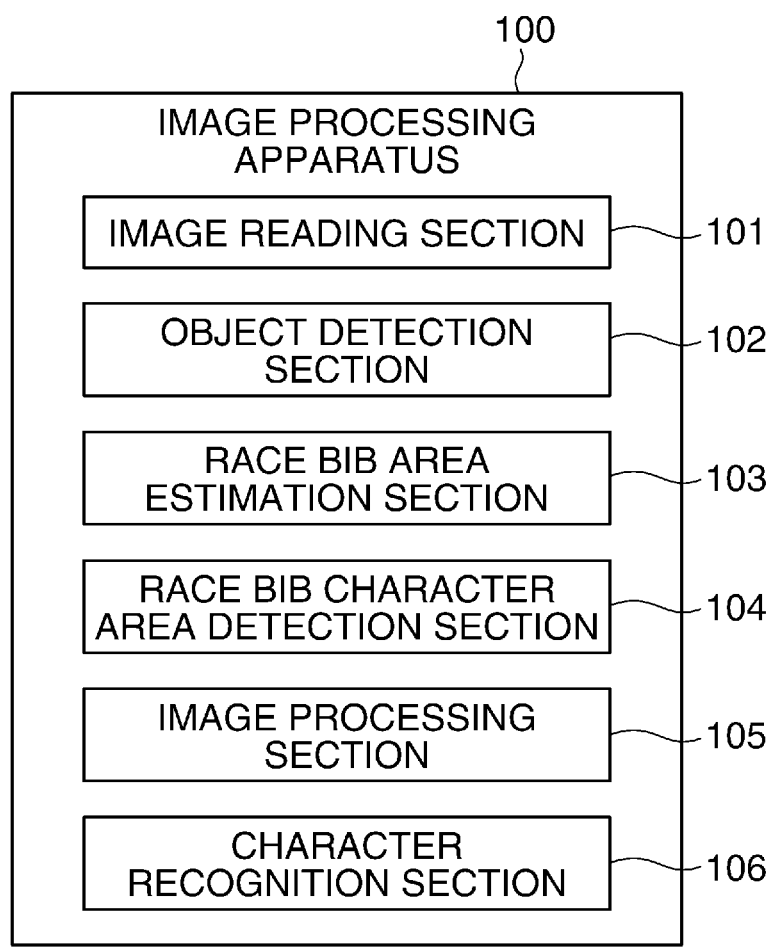
FIG. 1 is a block diagram of an example of an image processing apparatus 100 according to a first embodiment of the present invention.

FIG. 1 is a block diagram of an example of an image processing apparatus 100 according to a first embodiment of the present invention.

Configuration of Image Processing Apparatus 100

The illustrated image processing apparatus 100 is an apparatus, such as a personal computer (PC). The image processing apparatus 100 may be an apparatus, such as a mobile phone, a PDA, a smartphone, and a tablet terminal.

The image processing apparatus 100 includes a CPU, a memory, a communication section, and a storage section (none of which are shown) as the hardware configuration.

The CPU controls the overall operation of the image processing apparatus 100. The memory is a RAM, a ROM, and the like.

The communication section is an interface for connecting to e.g. a LAN, a wireless communication channel, and a serial interface, and is a function section for data transmission and reception of data to and from an image pickup apparatus for transmitting a photographed image to the image processing apparatus.

The storage section stores, as software, an operating system (hereinafter referred to as the OS: not shown), an image reading section 101, an object detection section 102, a race bib area estimation section 103, a race bib character area detection section 104, an image processing section 105, and a character recognition section 106, and stores software associated with other functions. Note that these software items are loaded into the memory, and operate under the control of the CPU.

The image reading section 101 reads a photographed image, a display drawing image, and so on, from the memory, and loads the read image into the memory of the image processing apparatus 100. More specifically, the image reading section 101 decompresses a compressed image file, such as a JPEG file, converts the image file to a raster image in an array of RGB values on a pixel-by-pixel, and loads the raster image into the memory of the PC. At this time, in a case where the number of pixels of the read photographed image is not large enough, pixel interpolation may be performed to thereby increase the number of pixels to a sufficiently large number so as to maintain a sufficient accuracy for detection of a person area by the object detection section 102, and recognition by the image processing section 105 and the character recognition section 106. Further, in a case where the number of pixels is larger than necessary, the number of pixels may be reduced by thinning the pixels so as to increase the speed of processing. Further, to correct a width and height relation of a photographed image, the photographed image may be rotated as required.

The object detection section 102 detects a person area within a photographed image. A method of detecting a person includes a method of detection based on features of a face of a person and features of organs, such as a mouth and eyes, a method of detection based on an Ω-like shape of a head to shoulders, and a method of detection based on a hue of a skin area or the like of a person, but is not limited to these, and a combination of a plurality of detection methods may be used.

The race bib area estimation section 103 estimates, based on the position of a face and a shoulder width, from a person area detected by the object detection section 102 in the photographed image, that a race bib character area exists in a torso in a downward direction from the face. Note that the object of which the existence is to be estimated is not limited to the race bib, but may be a uniform number, or identification information directly written on part of an object. Further, the estimation is not to be performed limitedly in the downward direction, but the direction can be changed according to a posture of a person or composition of a photographed image, on an as-needed basis.

The race bib character area detection section 104 detects a race bib character area which can be characters with respect to each area calculated by the race bib area estimation section 103. Here, the characters refer to an identifier which makes it possible to uniquely identify an object, such as numbers, alphabets, hiragana, katakana, Chinese characters, and a pattern of numbers, codes, and barcodes.

The image processing section 105 performs image processing with respect to each area detected by the race bib character area detection section 104 as pre-processing for character recognition.

The character recognition section 106 recognizes characters with respect to the image processed by the image processing section 105 based on a dictionary database in which image features of candidate characters are described, and associates the recognition result with a person image. The person image refers to part including a person in a photographed image.

Processing Flow Performed by Image Processing Apparatus 100

Figure 2:
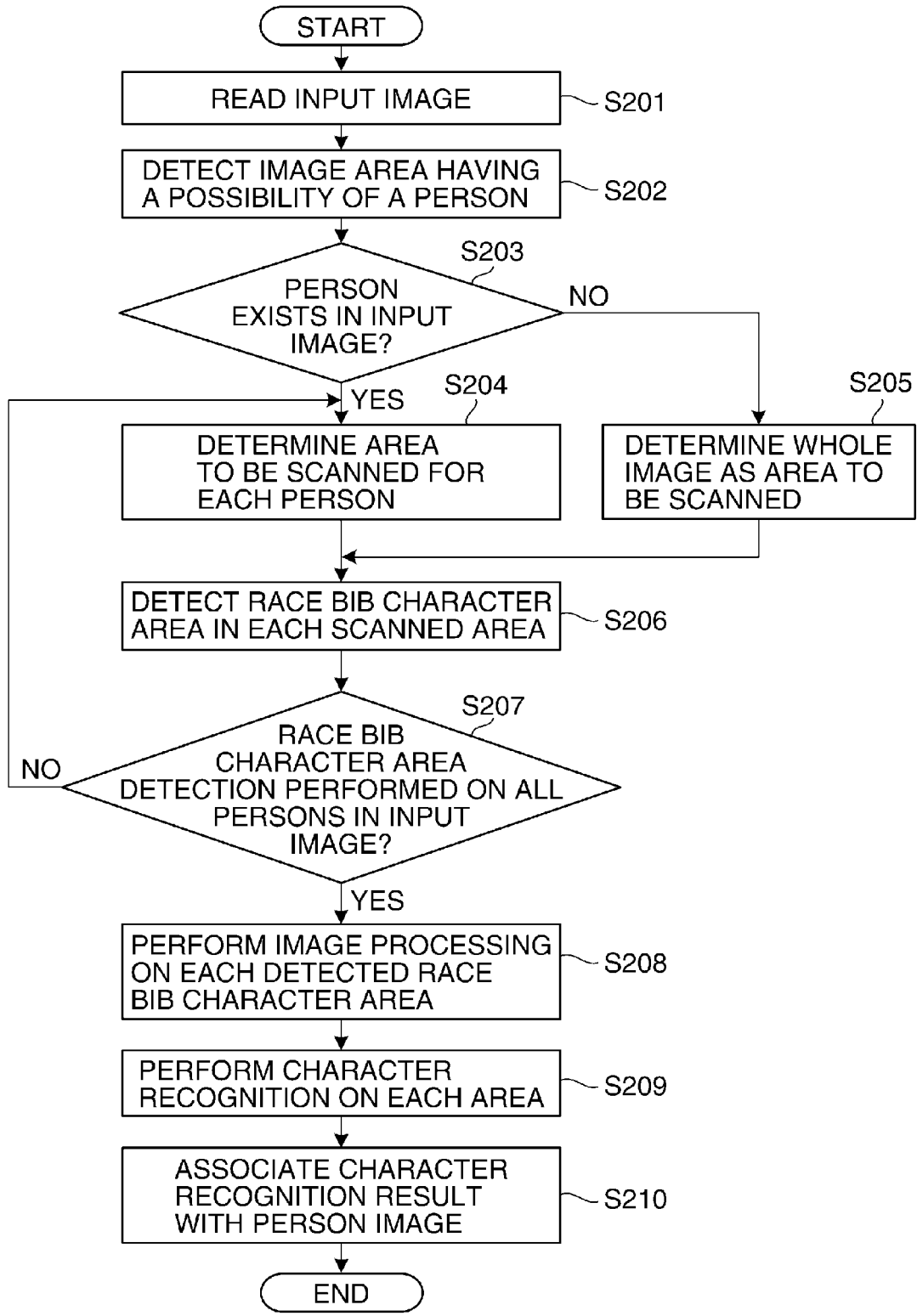
FIG. 2 is a flowchart useful in explaining a process performed by the image processing apparatus 100 from reading of a photographed image to associating of a race bib number with a person image.

FIG. 2 is a flowchart useful in explaining a process performed by the image processing apparatus 100, shown in FIG. 1, from reading of a photographed image to associating of a race bib number with a person image.

Referring to FIG. 2, when a photographed image is designated, the process is started, and the image reading section 101 reads the photographed image as an input image (step S201).

Next, the object detection section 102 scans the whole raster image of the read input image, and detects an image area having a possibility of a person (step S202).

The object detection section 102 determines whether or not there is an image area having a possibility of a person in the input image, i.e. whether or not a person exists in the input image (step S203), and if a person exists, the process proceeds to a step S204, whereas if no person exists, the process proceeds to a step S205.

If it is determined in the step S203 that one or more persons exist, the race bib area estimation section 103 estimates that a race bib character area is included for each person, and determines an area to be scanned (step S204). The area to be scanned is determined based on a size in the vertical direction of the input image and a width of the person area, and is set to an area in the downward direction from the face of the person. In the present example, the size in the vertical direction and the width of the area to be scanned may be changed according to the detection method used by the object detection section 102.

If it is determined in the step S203 that no person exists, the race bib area estimation section 103 determines the whole input image as the area to be scanned (step S205).

The race bib character area detection section 104 detects a race bib character area from the area to be scanned, which is determined for each person (step S206). As a candidate of the race bib character area, the race bib character area detection section 104 detects an image area which can be expected to be a race bib number, such as numerals and characters, and detects an image area including one or a plurality of characters. Here, although the expression of the race bib number is used, the race bib number is not limited to numbers.

The race bib character area detection section 104 determines whether or not race bib character area detection has been performed with respect to all persons included in the input image (step S207), and if there is a person on which race bib character area detection has not been performed yet (NO to the step S207), the process returns to the step S204 so as to perform race bib character area detection with respect to all persons. The areas described in the steps S201 to S207 will be described in detail hereinafter with reference to FIG. 3.

When race bib character area detection with respect to all persons is completed (YES to the step S207, including a case where an image area having a possibility of a person is not found in the step S203), the image processing section 105 performs image processing on each detected race bib character area as pre-processing for performing character recognition (step S208). Here, the image processing refers to deformation correction, inclination correction, depth correction, and so forth. Inclination correction and depth correction will be described in detail hereinafter with reference to FIGS. 4A to 4C, and FIGS. 5A to 5C. As for deformation correction, various well-known techniques can be applied, and hence description thereof is omitted.

When the image processing has been performed on all of the detected race bib character areas, the character recognition section 106 performs character recognition with respect to each race bib character area (step S209).

The character recognition section 106 associates a result of character recognition with the person image (step S210). When character recognition has been performed with respect to all race bib character areas, the process for associating a race bib number with a person image is terminated.

As to Detected Areas

Figure 3:
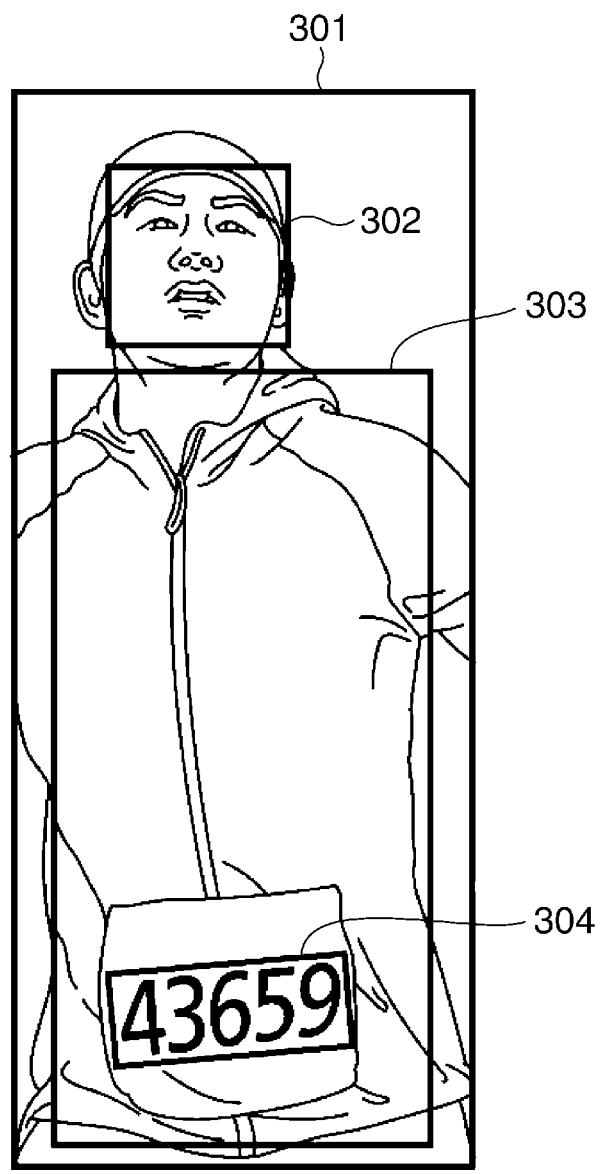
FIG. 3 is a view useful in explaining areas processed by an object detection section 102.

FIG. 3 is a view useful in explaining areas in which the object detection section 102, the race bib area estimation section 103, and the race bib character area detection section 104 perform processing, on each person within the input image in FIG. 2.

An image frame 301 is a frame of a photographed image, and the image reading section 101 loads image data into the memory.

A person area 302 is a person area detected by the object detection section 102.

A race bib estimated area 303 is a race bib estimated area estimated by the race bib area estimation section 103 with respect to the person area 302. Although the race bib estimated area 303 is shown here as a rectangular shape, by way of example, this is not limitative, but the race bib estimated area 303 may have a sector shape with the person area 302 in the center.

A race bib character area 304 is a race bib character area detected by the race bib character area detection section 104 with respect to the race bib estimated area 303.

As to Inclination Correction

Figure 4A:
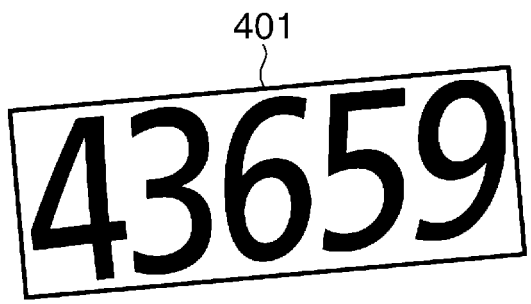
FIGS. 4A to 4C are views useful in explaining inclination correction performed on a race bib character area 304 by an image processing section 105.
Figure 4B:
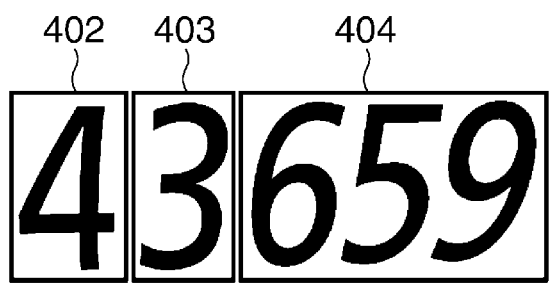
Figure 4C:
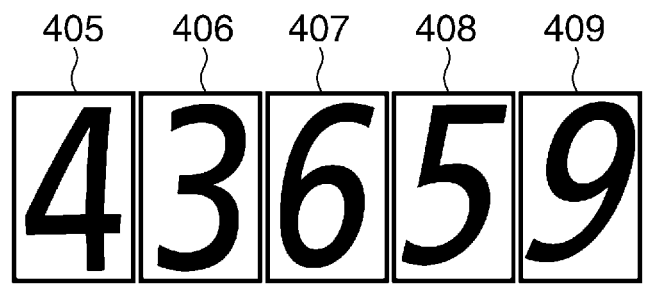

FIGS. 4A to 4C are views useful in explaining inclination correction performed by the image processing section 105 with respect to the race bib character area 304.

Referring to FIG. 4A, an image 401 is the race bib character area 304, and is an image including one or a plurality of characters. The race bib number of the image 401 is attached to the clothing of a runner, and hence the image 401 is an image which has each character deformed and is inclined from horizontal as a whole. Therefore, each character cannot be properly extracted directly from the image 401, and hence it is difficult for the character recognition section 106 to perform character recognition.

Referring to FIG. 4B, an intermediate image 402, an intermediate image 403, and an intermediate image 404 are intermediate images corrected by the image processing section 105, and are obtained by mapping the image 401 in the horizontal direction using Affine transformation based on an angle inclined from a reference line (horizontal direction), which is calculated from the race bib character area 304. Note that the reference line mentioned here is a reference line based on an X-axis (horizontal direction) or a Y-axis (vertical direction) of the photographed image. The X-axis is used as the reference line for a character string in horizontal writing, the Y-axis is used as the reference line for a character string in vertical writing, and correction processing is performed based on an angle inclined from the reference line.

Referring to the intermediate image 402, the intermediate image 403, and the intermediate image 404, in FIG. 4B, characters shown therein are each deformed and have different inclinations. Therefore, there can be a case, as in the case of the intermediate image 404, in which there is little spacing in the vertical direction and characters are very close to each other.

Although in the intermediate images 402 and 403, each character can be recognized as one character, the intermediate image 404 is an image in which the plurality of characters are recognized as one character due to respective different inclinations of the characters. Therefore, in such a case of the intermediate image 404, the character recognition section 106 cannot correctly recognize each character.

Referring to images 405 to 409, in FIG. 4C, the images are obtained by further correcting the intermediate image 404 in the image processing section 105. The image processing section 105 detects the outline and the position of each character from the intermediate image 402, the intermediate image 403, and the intermediate image 404, respectively. The image processing section 105 adjusts the position of each character in the horizontal direction based on a width of the detected outline of each character such that a spacing in the vertical direction is generated for each character to thereby generate the images 405 to 409. By separating the characters as above, the character recognition section 106 can correctly recognize each character.

Depth Correction

Figure 5A:
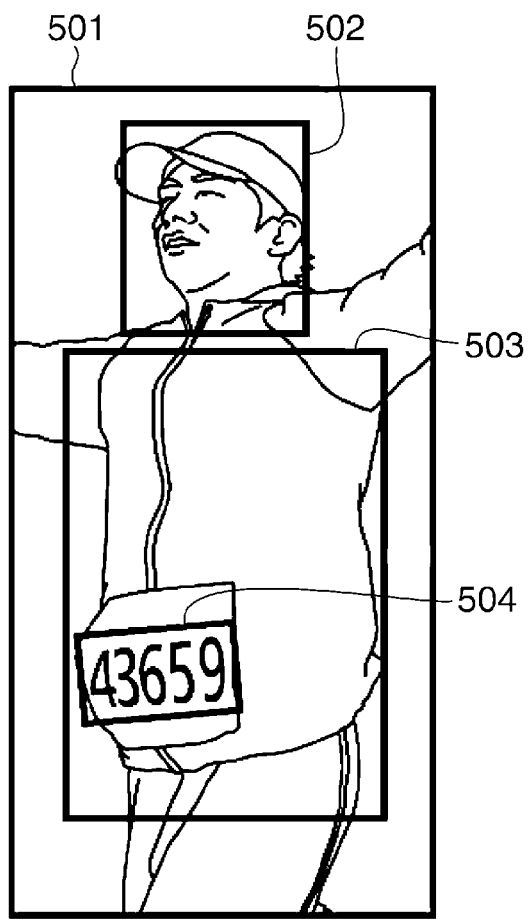
FIGS. 5A to 5C are views useful in explaining depth correction performed on a race bib character area having a depth by the image processing section 105.
Figure 5B:
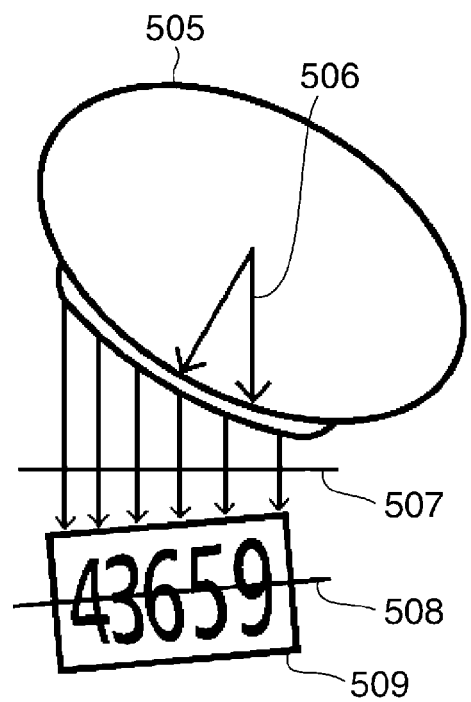
Figure 5C:
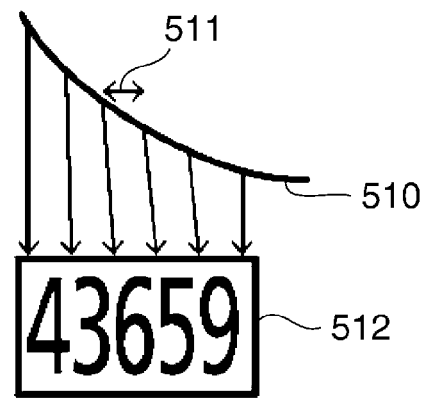

FIGS. 5A to 5C are views useful in explaining depth correction performed by the image processing section 105 with respect to a race bib character area having a depth.

Referring to FIG. 5A, an image frame 501 is a frame of a photographed image. A person area 502 is detected by the object detection section 102. A race bib estimated area 503 is estimated by the race bib area estimation section 103 with respect to the person area 502. A race bib character area 504 is detected by the race bib character area detection section 104 with respect to the race bib estimated area 503.

As shown in the race bib character area 504, a race bib of a person who faces in a lateral direction has a depth generated in the image of the race bib character area, and a character width and a character interval become narrower from the near side toward the far side. Thus, in such an image as shown in the race bib character area 504, the character recognition section 106 recognizes the characters as one character due to the influence of different character widths or the combining of characters adjacent to each other, and hence the character recognition section 106 cannot perform correct character recognition.

To solve this problem, in a case where the organs on the face of a person, such as a mouth and eyes, exist in the person area 502, not in a front direction, but in a manner unevenly distributed in a right or left direction, the object detection section 102 judges that the person is oriented in a lateral direction. Then, an orientation angle of the face is calculated based on a degree of the uneven distribution.

The image processing section 105 corrects the image based on the calculated orientation angle of the face.

Referring to FIG. 5B, a torso 505 is a schematic representation of the torso of the person from an upper part. Here, the torso 505 has an elliptical shape, and the orientation of the torso 505 is estimated to be equivalent to the orientation angle of the face, and the angle is indicated by an orientation angle 506. This makes it possible to approximate an image 509 of the race bib character area 504 to the image attached to the front side of the elliptical shape.

It is assumed that the race bib draws a curve based on the orientation angle 506 with respect to the torso 505. An interval of characters is calculated with respect to a horizontal axis 507, and this is defined as an assumed density, assuming that the image 509 has been photographed at the calculated interval (ratio).

Referring to FIG. 5C, a curve 510 is a curve generated by the orientation angle 506. An inclination of the characters of the image 509 is calculated, and the reciprocal of the assumed density is calculated in a horizontal direction of a center line 508 of the image 509 (the same direction as the horizontal axis 507). A curve for correcting a pixel interval of the image 509 using the reciprocal of the calculated assumed density is the curve 510.

The width of a local line segment 511 in the lateral direction for each unit angle of the curve 510 becomes narrower from the near side toward the far side in the image 509.

The pixel positions of each character of the image 509 are calculated based on the curve 510 while performing inclination correction, and the character width is corrected by extending or contracting the horizontal direction of each pixel to thereby generate a corrected image 512. Note that in the extension or contraction, a multiple of the reciprocal of the assumed density of each pixel value of the image 509 may be directly transferred, or values each calculated from pixel values at neighboring locations may be used to make the image smooth. The pixel value is a value representing the type of color and brightness of the pixel.

The image processing section 105 performs the above-described image processing, whereby it is possible to correct the character width and the character interval even with respect to the race bib character area having a depth, and it is possible for the character recognition section 106 to correctly recognize the characters.

Further, although the inclination correction processing in FIGS. 4A to 4C and the depth correction processing in FIGS. 5A to 5C are separately described, inclination correction and depth correction may be performed as one image processing.

As described heretofore, according to the first embodiment of the present invention, it is possible to read a race bib number by detecting a race bib of a person from within a photographed image, and performing image correction such as inclination correction and depth correction, and associate the race bib number and the person image with each other.

Second Embodiment

Next, a description will be given of a second embodiment of the present invention. The second embodiment is characterized in that to solve a problem that part of a race bib is hidden by overlapping of another person or positioning of a hand of a runner himself/herself in front of the race bib, which prevents the race bib number from being correctly recognized, the hidden race bib number is estimated from a detected race bib character area.

An example of an image processing apparatus 110 according to the second embodiment will be described. In the present embodiment, a frame area detection section 107 and a character count estimation section 108 are added to the configuration of the image processing apparatus 100 described in the first embodiment.

Figure 6:
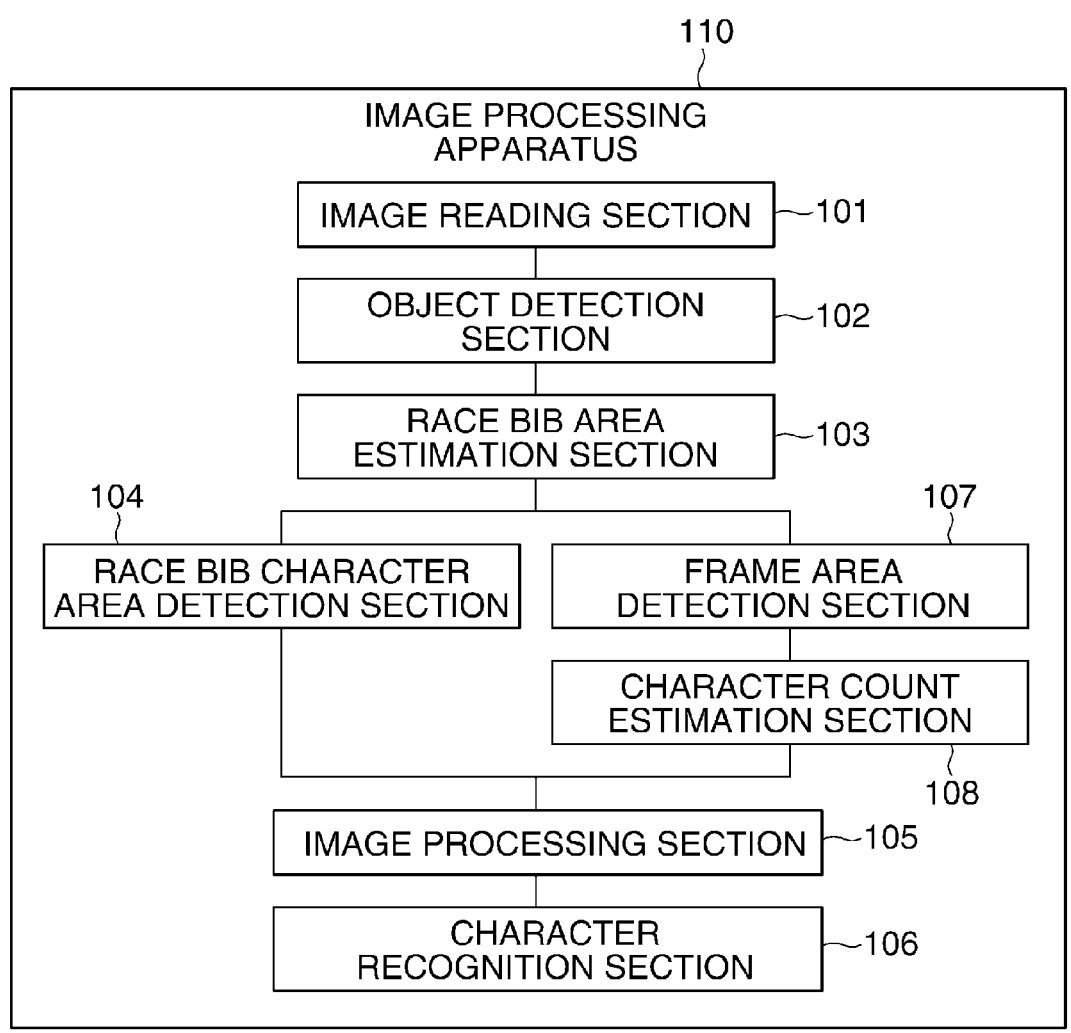
FIG. 6 is a block diagram of an example of an image processing apparatus 110 according to a second embodiment of the present invention.

FIG. 6 is a block diagram of an example of the image processing apparatus 110 according to the second embodiment of the present invention. Note that the same component elements as those of the image processing apparatus 100 shown in FIG. 1 are denoted by the same reference numerals, and description thereof is omitted.

The frame area detection section 107 detects a frame area which can be a frame of a race bib with respect to each race bib estimated area calculated by the race bib area estimation section 103.

The character count estimation section 108 estimates position coordinates of the respective digits which are equally arranged based on a frame width of the frame area detected by the frame area detection section 107, and calculates the number of digits. Note that the frame width mentioned here refers to a direction in which the characters of the race bib are arranged (long side direction). Further, the frame width is not limitative, but it is possible to apply to a frame height.

Process Flow of Image Processing Apparatus 110

Figure 7:
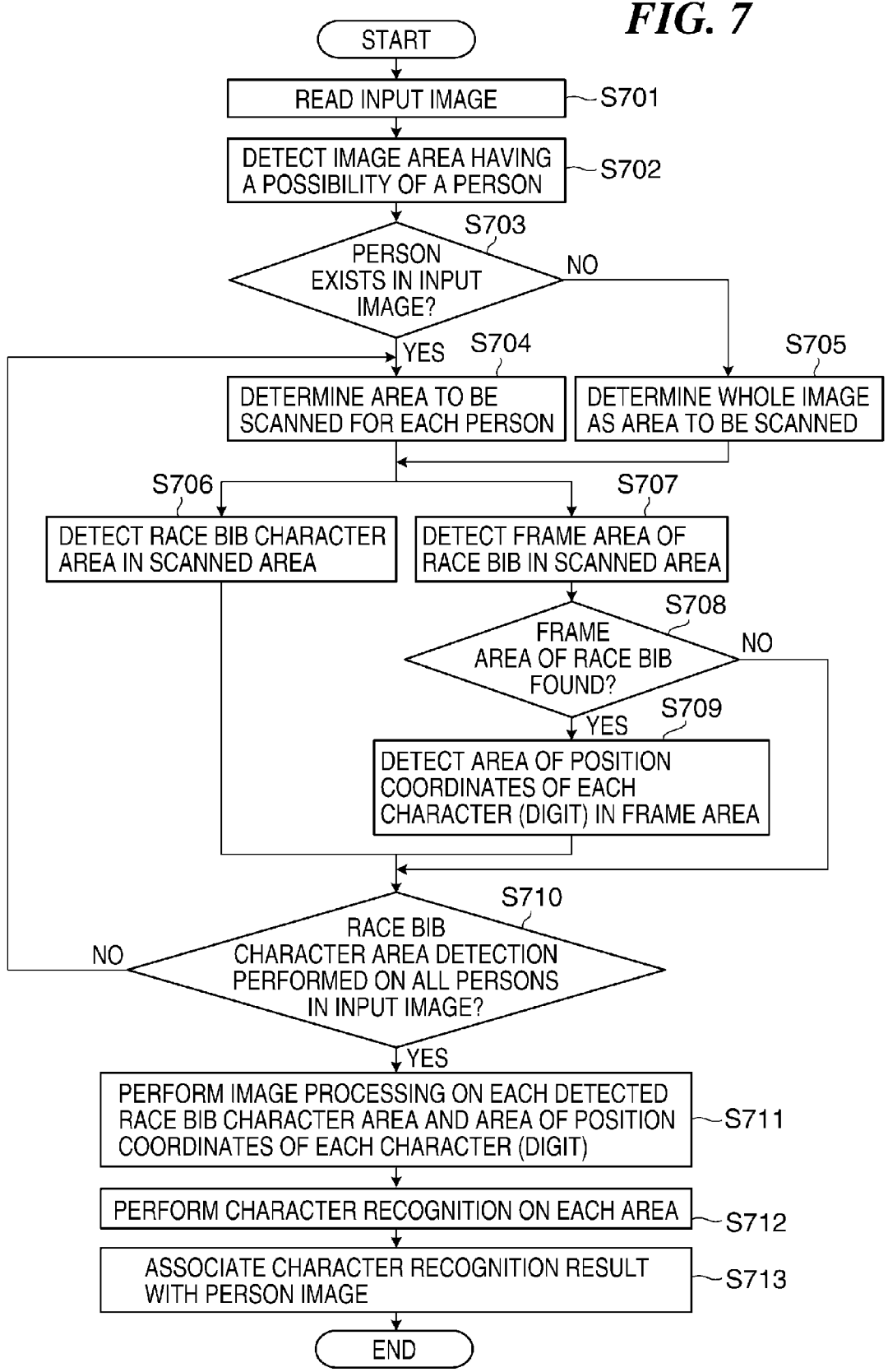
FIG. 7 is a flowchart useful in explaining a process performed by the image processing apparatus 110 from reading of a photographed image to associating of a race bib number with a person image.

FIG. 7 is a flowchart useful in explaining a process performed by the image processing apparatus 110 shown in FIG. 6, from reading of a photographed image to associating of a race bib number with a person image.

Referring to FIG. 7, when a photographed image is designated, the process is started, and the image reading section 101 reads the photographed image as an input image (step S701).

Next, the object detection section 102 scans the whole raster image of the read input image, and detects an image area having a possibility of a person (step S702).

The object detection section 102 determines whether or not there is an image area having a possibility of a person in the input image, i.e. whether or not a person exists in the input image (step S703), and if a person exists, the process proceeds to a step S7204, whereas if no person exists, the process proceeds to a step S705.

If it is determined in the step S703 that one or more persons exist, the race bib area estimation section 103 estimates that a race bib character area is included on a person-by-person basis, and determines an area to be scanned (step S704). The area to be scanned is determined based on a size in the vertical direction of the input image and a width of the person area, and is set to an area in a downward direction from the face of the person. Here, the size in the vertical direction and the width of the area to be scanned may be changed depending on the detection method used by the object detection section 102.

If it is determined in the step S703 that no person exists, the race bib area estimation section 103 determines the whole input image as the area to be scanned (step S705).

A step S706 and steps S707 to S709, described hereafter, are executed in parallel.

The race bib character area detection section 104 detects a race bib character area from the area to be scanned, which is determined on a person-by-person basis (step S706). As a candidate of the race bib character area, the race bib character area detection section 104 detects an image area which can be expected to be a race bib number, such as numerals and characters, and detects an image area including one or a plurality of characters.

In each area to be scanned, the frame area detection section 107 detects edge lines in the vertical direction and the horizontal direction, and detects a frame area of the race bib based on the positional relationship between the detected edge lines (step S707).

If one or more bib frame areas are detected (YES to the step S708), the character count estimation section 108 calculates an area of the position coordinates of each character (digit) within the frame area e.g. based on the frame width of the frame area detected in the step S707 (step S709).

If no bib frame area is detected (NO to the step S708), the process proceeds to a step S710 without executing the step S709.

The race bib character area detection section 104 determines whether or not race bib character area detection has been performed with respect to all persons within the input image (step S710), and if there is a person on which race bib character area detection has not been performed yet (NO to the step S710), the process returns to the step S704, for detection of race bib character area with respect to all persons.

If race bib character area detection respect to all persons is completed (YES to the step S710. Note that a case where an image area having a possibility of a person is not found in the step S703 is included), the image processing section 105 performs image processing for performing character recognition with respect to each detected race bib character area and frame area (step S711). Note that if the race bib character area detected in the step S706 and the area calculated in the step S709 are equivalent to each other, the race bib character area and the area indicated by the position coordinates of each character (digit) may be combined to handle these areas as one area.

When image processing with respect to all race bib character areas is completed, the character recognition section 106 performs character recognition with respect to each race bib character area (step S712).

The character recognition section 106 associates the result of character recognition with the person image (step S713). When character recognition with respect to all race bib character areas is completed, the process for associating the race bib number and the person image is terminated.

As to Estimation of Hidden Characters

Figure 8A:
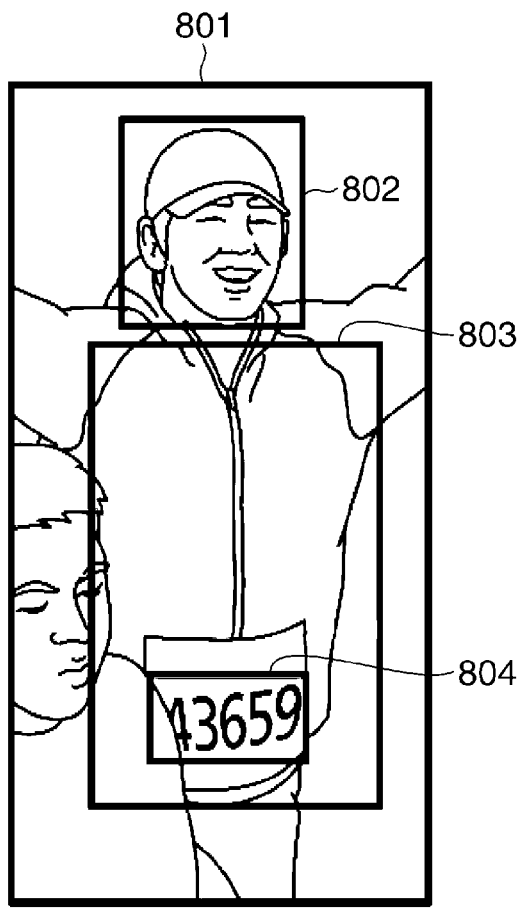
FIGS. 8A to 8C are views useful in explaining detection of a frame and a character area of a race bib.
Figure 8B:
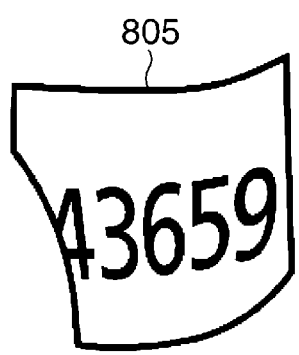
Figure 8C:
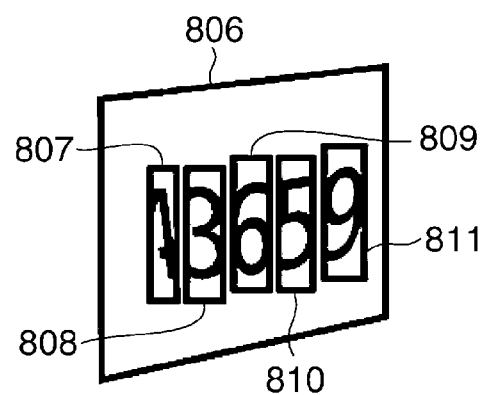

FIGS. 8A to 8C are views useful in explaining detection of a frame and a character area of a race bib.

In a photographed image shown in FIG. 8A, an image frame 801 is a frame of the photographed image, and the image reading section 101 loads image data into the memory.

A person area 802 is detected by the object detection section 102.

A race bib estimated area 803 is estimated with respect to the person area 802 by the race bib area estimation section 103.

A race bib character area 804 is detected with respect to the race bib estimated area 803 by the race bib character area detection section 104.

In the present example, part of the race bib character area 804 is hidden by overlapping of a person in front, so that part of the characters cannot be read by the character recognition section 106.

An image 805 in FIG. 8B is an example of the image of the race bib part of which is hidden.

The frame area detection section 107 detects neighboring pixel values continuous in the vertical direction and the horizontal direction within the race bib estimated area 803, and pixels (edge pixels) which form edges of pixel values, each having an amount of change not less than a threshold value. Approximate straight lines which form a frame of the race bib are generated based on the positions of edge pixels in the vertical direction and the horizontal direction and the numbers of continuous pixel values.

A bib frame area 806 shown in FIG. 8C is a bib frame area formed by the approximate straight lines generated by the frame area detection section 107.

The character count estimation section 108 retrieves an area in the vicinity of the intermediate portion in the vertical direction of the detected bib frame area 806, and sets the area as the character area.

A character area 807, a character area 808, a character area 809, a character area 810, and a character area 811 are character areas detected by the character count estimation section 108.

Here, the character area 807 is a character area corresponding to a hidden character as in the race bib character area 804, and the character area cannot be correctly detected.

On the other hand, in the character areas 808 to 811, where the character areas are correctly detected, the character width and the position in the vertical direction of each digit are equally detected.

The character count estimation section 108 can determine that the image is an image having one-digit arbitrary character and four-digit fixed characters based on a relationship between the respective digits of the character areas 808 to 811 which are equal in character width and the character area 807 which is different in character width. The four-digit fixed characters are recognized by the image processing section 105 and the character recognition section 106. As for the one-digit arbitrary character, the character in the bib frame is provisionally generated by applying a character which can be assumed. Here, as the character to be applied, a character, such as numbers 0 to 9, may be applied, or a character may be applied with reference to a character list of all race bib numbers for the event, set in advance. Further, by making use of the fact that persons having the same character string do not exist within the same image, it is also possible to exclusively generate a character.

Although the case where hidden characters are estimated based on the character width is described with reference to FIGS. 6 to 8, by way of example, this is not limitative, but hidden characters may be estimated based on a height of characters, which is in a direction orthogonal to the direction indicated as the example. Further, in a case where a specific color is used for each digit of the race bib number, it is possible to determine the characters based on whether or not the specific color is included in a detected character area.

As described above, according to the second embodiment of the present invention, it is possible to efficiently detect a race bib of a person from within a photographed image, and estimate the hidden race bib number based on the character width of the character area or the like.

Further, although in the second embodiment of the present invention, the processing performed by the race bib character area detection section 104 and the processing operation performed by the frame area detection section 107 and the character count estimation section 108 are performed in parallel, this is not limitative, but the processing operations may be performed in series, or one of the processing operations may be performed.

Third Embodiment

Next, a description will be given of a third embodiment of the present invention. In the present embodiment, there is shown an example of application to a moving image in which a race bib number of a person appearing in the moving image is caused to be recognized for each reproduction time of the moving image, and the reproduction time of the moving image and the race bib number are associated with each other.

In the third embodiment, the image processing apparatus monitors a moving image reproduction application (not shown) which is reproducing a moving image, and sequentially cuts out the moving image as a still image for character recognition. Next, a reproduction time of the cut-out still image during reproduction of the moving image and the recognized characters are recorded. This makes it possible to start reproduction of a moving image from a reproduction time at which a person having a specific race bib number designated by the user appears.

Figure 9:
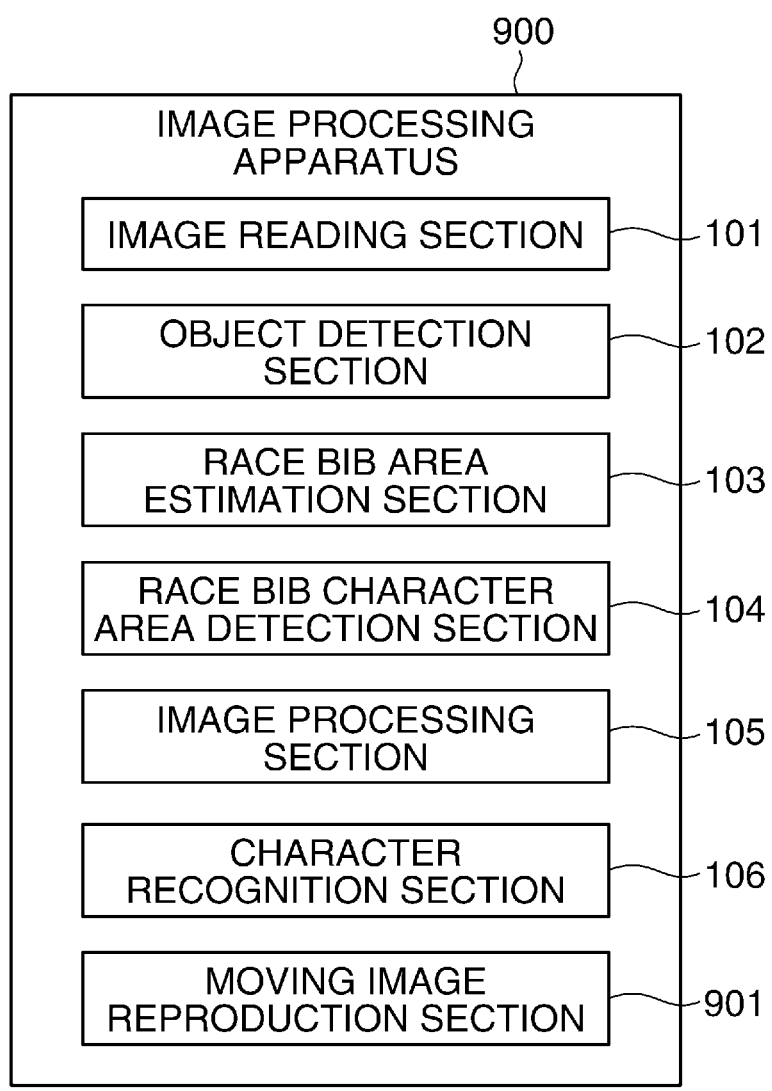
FIG. 9 is a block diagram of an example of an image processing apparatus 900 according to a third embodiment of the present invention.

FIG. 9 is a block diagram of an example of an image processing apparatus 900 according to the third embodiment of the present invention. A moving image reproduction section 901 is added to the configuration of the image processing apparatus 100 (FIG. 1) in the first embodiment. The same component elements as those in FIG. 1 are denoted by the same reference numerals. The moving image reproduction section 901, the image reading section 101, and the character recognition section 106, which are different between the first and second embodiments, will be described in the following.

Referring to FIG. 9, the image reading section 101 is provided with not only the function described in the first and second embodiments, but also a function for cutting out (generating) still images from a moving image. As a method of cutting out still images from a moving image, still images are cut out at intervals of a predetermined time period or frames of the moving image, for example.

The moving image reproduction section 901 is a function section that handles information necessary for moving image reproduction. The necessary information includes reproduction time information, information designated by a user, and so forth. The reproduction time information is information indicative of relative time from the start time to the termination time of a moving image. The information designated by a user is a race bib number of an object.

The image processing apparatus 900 designates or detects a reproduction time of a moving image to be recognized (target moving image), whereby the moving image reproduction section 901 causes the reproduction time information held therein to match moving image reproduction time. The moving image reproduction time is reproduction time of a moving image as the target. The reproduction time information is information held by the moving image reproduction section 901 of the image processing apparatus 900. The moving image reproduction time is information held by the moving image reproduction application, and is information on reproduction time from the leading end of the moving image as the target being reproduced.

Here, designation of the reproduction time is by estimating the moving image reproduction time through causing the moving image reproduction application to be started from the image processing apparatus 900 to cause reproduction to be started. Further, detection of the reproduction time is recognition of an elapsed time displayed on a screen of the moving image reproduction application, or detection of the reproduction time information e.g. according to notification from the moving image reproduction application, by the moving image reproduction section 901.

The moving image reproduction section 901 measures the reproduction elapsed time in the image processing apparatus 900 to thereby sequentially update the reproduction time information, and estimate the current reproduction time of the moving image.

The character recognition section 106 is provided with not only the function described in the first and second embodiments, but also a function for recording characters recognized, for each reproduction time information calculated by the moving image reproduction section 901, through the processing operations performed by the function sections of the image reading section 101, the object detection section 102, the race bib area estimation section 103, the race bib character area detection section 104, the image processing section 105, and the character recognition section 106, in a storage section, such as a database (not shown), in association with the reproduction time.

The moving image reproduction section 901 refers to the reproduction time information recorded in the database or the like by the character recognition section 106, calculates a reproduction time at which is recognized a race bib number selected by a user's predetermined operation or an external input, and reproduces the moving image while designating the reproduction time to the target moving image.

Here, designation of the reproduction time is by an argument or the like passed to the moving image reproduction application, together with designation of an target moving image, and for example, when performing moving image reproduction of YouTube (registered trademark) on the Internet, it is possible to specify a reproduction time to be started to a browser application by describing # t=(reproduction start time) together with a path to the target moving image.

Process Flow of Image Processing Apparatus 900

FIG. 10 is a flowchart useful in explaining a process performed by the image processing apparatus 900 shown in FIG. 9 from performing synchronization of moving image reproduction to reproducing a moving image of a runner having a race bib number selected by a user. Here, synchronization refers to causing the reproduction time information to match the moving image reproduction time.

Referring to FIG. 10, the moving image reproduction section 901 performs synchronization of moving image reproduction, by reproducing the target moving image by designating the reproduction start time, or detecting the current reproduction time of the moving image being reproduced, to thereby cause the reproduction time information of the moving image reproduction section 901 to match the moving image reproduction time (step S1001). For example, it is possible to perform synchronization of moving image reproduction by causing the image processing apparatus 900 to start moving image reproduction from the start, by setting reproduction time information=0. Here, the target moving image may be a moving image file reproduced by a single application. For example, the target moving image may be a streaming moving image distributed from a server on the Internet, and is only required to be reproduced as the moving image within a display window area of the moving image reproduction application.

Next, before performing sequential reading of images from the moving image as still images and character recognition processing, the current reproduction time information of the moving image is calculated, by recognizing the reproduction time from within the moving image displaying area and counting the reproduction time information after synchronization, so as to associate the result of character recognition in the database with the reproduction time information (step S1002).

The image reading section 101 detects the display window area of the specific moving mage reproduction application, copies the content of an image being displayed from the moving image reproducing screen into the memory or a file, and generates an input image (still image) for recognition processing (step S1003).

Character recognition is performed with respect to the input image generated in the step S1003 (step S1004). As for details of the character recognition, the flowchart (steps S201 to S210) in FIG. 2 in the first embodiment or the flowchart (steps S701 to S713) in FIG. 7 in the second embodiment is applied.

The moving image reproduction section 901 records the reproduction time information calculated in the step S1002 and the characters recognized in the step S1004 (step S1005). Here, a recording destination is a memory or a file disposed in the image processing apparatus 900, or may be notification to a server on the Internet.

It is determined whether or not reproduction of the target moving image is terminated, and if reproduction of the target moving image is continued (NO to a step S1006), the process returns to the step S1002, wherein calculation of the next reproduction time information and character recognition of the input image are performed.

If reproduction of the target moving image is terminated (YES to the step S1006), the recognized characters are displayed on a selection dialog or the like based on the information of the recognized characters recorded in the step S1005 to prompt a user to select recognized characters by a predetermined operation (step S1007). Note that recognized characters may be selected by an external input, and in this case, for example, the recognized characters desired to be reproduced may be designated from another application.

If the user does not select specific recognized characters (NO to a step S1008), the present process is terminated.

If the user selects specific recognized characters out of the recognized characters displayed within the dialog (YES to the step S1008), the reproduction time of the recognized characters selected in the step S1008 is detected by referring to the reproduction time information recorded in the step S1005, and moving image reproduction is performed while designating reproduction time for the target moving image (step S1009).

Here, an option of designating the reproduction time is performed for a application for reproducing a moving image file or an Internet server that reproduces a streaming moving image.

In the process flow in FIG. 10, the step in which recognized characters are selected by a user (step S1007) and the step for reproducing a moving image, while accompanying time designation (step S1009) are provided after moving image reproduction is terminated. However, in such a case of a streaming moving image on the Internet, which is formed by a server and a plurality of client computers, before moving image reproduction is terminated in the step S1006 of the present image processing apparatus on one client computer, the recognized character selection step in the step S1007 and the moving image reproduction step in the step S1009 can be performed by another client computer based on reproduction time information and recognized character information notified to the server in the step S1005.

In a case where the recognized characters selected by the user appear in a plurality of scenes within the moving image, moving image reproduction may be performed using an option for designating a plurality of reproduction times in the step S1009.

As described above, according to the third embodiment of the present invention, a race bib of a person is detected from a reproduced moving image, and a reproduction time and a race bib number are stored in association with each other. By designating the race bib number, it is possible to reproduce a moving image in which appears the person with the specific race bib number, out of the reproduced moving image.

It should be noted that the present invention is not limited to the above-described embodiments, but it can be practiced in various forms, without departing from the spirit and scope thereof.

Although in the present embodiments, an object is described as a person, the object is not limited to a person, but may be an animal, a vehicle, or the like. Further, although in the description given above, the result of character recognition is associated with a person image within the photographed image, it may be associated with the photographed image itself.

In addition, although a character string in horizontal writing is described by way of example, this is not limitative, but the present embodiment may be applied to a character string in vertical writing and a character string extending in an oblique direction.

Further, it is to be understood that the present invention may also be accomplished by supplying a system or an apparatus with a storage medium in which is stored a program code of software, which realizes the functions of the above described embodiments, and causing a computer (or a CPU, an MPU or the like) of the system or apparatus to read out and execute the program code stored in the storage medium.

In this case, the program code itself read out from the storage medium realizes the functions of the above-described embodiments, and the computer-readable storage medium storing the program code forms the present invention.

Further, an OS (operating system) or the like operating on a computer performs part or all of actual processes based on commands from the program code, and the functions of the above-described embodiments may be realized by these processes.

Further, after the program code read out from the storage medium is written into a memory provided in a function expansion board inserted in the computer or a function expansion unit connected to the computer, a CPU or the like provided in the function expansion board or the function expansion unit executes part or all of the actual processes based on commands from the program code, and the above-described embodiments may be realized according to the processes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a bypass continuation application of PCT International Application PCT/JP2015/084585 filed on Dec. 3, 2015 which is based on and claims priority from Japanese Patent Application No. 2014-259258, filed Dec. 22, 2014, and Japanese Patent Application No. 2015-193735, filed Sep. 30, 2015, the contents of which are hereby incorporated by reference herein in their entirety.

What is claimed is:

1. An image processing method, comprising:
    an object detection step of detecting one or a plurality of specific objects from an input image;
    a first area estimation step of estimating a first area in which identification information for identifying the object exists, from a position of the object detected in said object detection step;
    a second area detection step of detecting a second area including the identification information, within the first area estimated in said first area estimation step;
    an image processing step of performing image processing with respect to the second area detected in said second area detection step; and
    an identification information recognition step of performing character recognition processing of the identification information with respect to a processing result in said image processing step, and associating a result of the character recognition processing with the input image,
    wherein said object detection step detects an object by detecting a face position of the object,
    wherein said object detection step is capable of detecting not only the face position of the object, but also an orientation of the face, and
    wherein said image processing step controls, on an image of the second area, execution of image processing in which an interval of characters assumed to be arranged based on the orientation of the face detected in said object detection step is extended and contracted in a predetermined direction.

2. The image processing method according to claim 1, wherein said object detection step performs processing, using still images cut out from a moving image at predetermined intervals, as the input image.

3. The image processing method according to claim 2, wherein said identification information recognition step further performs association of the result of the character recognition processing with a reproduction time, and
    the image processing method further includes a moving image reproduction step of reproducing, based on the identification information selected by a predetermined operation of a user or an external input, the moving image from the reproduction time associated with the identification information.

4. The image processing method according to claim 1, further comprising a third area detection step of detecting a third area based on information indicative of a size or an area of the identification information within the first area; and
    an information count estimation step of estimating the number of information items in the identification information from the third area detected in said third area detection step,
    wherein said image processing step performs image processing with respect to the second area detected in said second area detection step or each of areas in the third area, which correspond to the number of information items detected in said information count estimation step.

5. The image processing method according to claim 4, wherein said information count estimation step estimates the number of information items based on a width or a height of the third area.

6. The image processing method according to claim 4, wherein in a case where there is an area among areas within the third area, which is different in width or height from other areas, said information count estimation step applies provisional information to the area.

7. The image processing method according to claim 1, wherein said object detection step detects an object by detecting a shape of a head to shoulders of the object.

8. The image processing method according to claim 1, wherein said object detection step detects an object by detecting a skin area of the object.

9. The image processing method according to claim 1, wherein said image processing step performs deformation correction.

10. The image processing method according to claim 1, wherein said image processing step performs inclination correction in which an image of the second area is mapped in a predetermined direction based on an inclination angle with respect to a reference line of the input image, and an interval of characters is adjusted.

11. An image processing method, comprising:
    an object detection step of detecting one or a plurality of specific objects from an input image;
    a first area estimation step of estimating a first area in which identification information for identifying the object exists, from a position of the object detected in said object detection step;
    a third area detection step of detecting a third area based on information indicative of a size or an area of the identification information, within the first area;

an information count estimation step of estimating the number of information items in the identification information from the third area detected in said third area detection step;

an image processing step of performing image processing with respect to the third area detected in said third area detection step; and an identification information recognition step of performing character recognition processing of the identification information with respect to a processing result in said image processing step, and associating a result of the character recognition processing with the input image, wherein, in a case where there is an area among areas within the third area, which is different in width or height from other areas, said information count estimation step applies provisional information to the area.

12. The image processing method according to claim 11, wherein said object detection step performs processing, using still images cut out from a moving image at predetermined intervals, as the input image.

13. The image processing method according to claim 12, wherein said identification information recognition step further performs association of the result of the character recognition processing with a reproduction time, and the image processing method further comprising a moving image reproduction step of reproducing, based on the identification information selected by a predetermined operation of a user or an external input, the moving image from the reproduction time associated with the identification information.

14. The image processing method according to claim 11, wherein said information count estimation step estimates the number of information items based on a width or a height of the third area.

* * * * *